Figure 1:
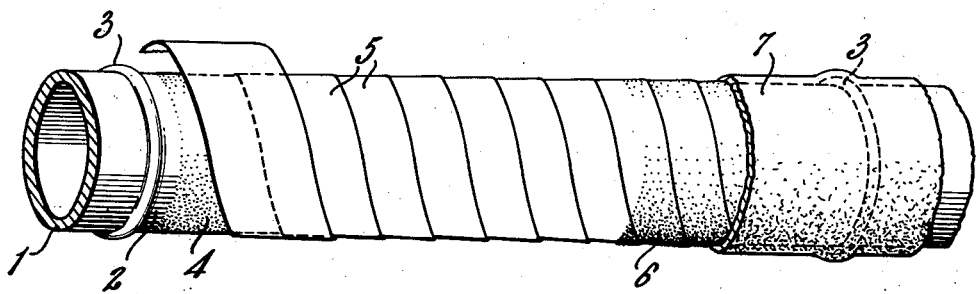

June 6, 1939.   H. F. GREMMEL ET AL   2,161,036
METHOD OF PROTECTING PIPE LINES

Filed Sept. 30, 1936

INVENTORS
Henry F. Gremmel
Harold D. Rice
BY
ATTORNEY.

Patented June 6, 1939

2,161,036

UNITED STATES PATENT OFFICE 2,161,036

METHOD OF PROTECTING PIPE LINES

Henry F. Gremmel, Rutherford, N. J., and Harold D. Rice, Barrington, R. I., assignor, by mesne assignments, to United States Rubber Company, New York, N. Y., a corporation of New Jersey Application September 30, 1936, Serial No. 103,328

6 Claims. (Cl. 154—2)

Our invention relates to a method of protecting pipe lines, and more particularly to the protection of pipe lines for oil, gas, water, and the like, of considerable lengths.

Pipe lines for oil, gas, water, and the like, are constructed of sections of pipe of various metals which are joined by welding or by connecting flanges into continuous lengths of considerable distance, often being many miles in length without interruption. Such pipe lines are subject to deterioration from two common causes; one is electrolytic corrosion, and the other is mechanical injury to the pipe arising from contact with the surrounding soil.

The most common method of protecting pipe lines now in use is to clean the outer surface of the pipe, apply a layer of enamel and cover the enamel layer with an asphalt composition. Often the asphalt is, in turn, covered by one or more layers of heavy paper. In such constructions when the paper is used a great deal of difficulty is experienced in covering welds or flanges at the ends of pipe lengths, because the paper does not readily conform to the irregular surfaces.

As the pipe sections are joined into a continuous pipe line, the usual practice is to lower the joined pipe into a ditch and back-fill the ditch with the material being excavated at the front end of the ditch. In this operation stones and rocks in the earth are very apt to penetrate the asphalt and/or paper coverings and expose the metal to the soil. In other cases the rocks become embedded in the asphalt composition and during the subsequent elongation and contraction of the pipe line due to temperature changes the embedded rocks or stones cut and wear through the asphalt composition until the pipe is exposed.

It has heretofore been proposed to cover such pipe lengths with rubber at the factory and ship the rubber covered pipe to the place of installation.

We provide a pipe line having a continuous soft rubber covering which covering is applied in the field as the pipe line is laid, or if desired, the covering may be applied to the subsequently uncovered pipe line, or portions thereof. Such a soft rubber covering is chemically resistant to the acids usually found in soil and is sufficiently tenacious and resilient to resist penetration by the rocks and stones encountered during the ditch filling operation and during the elongation and contraction of the pipe lines due to temperature changes. The covering excludes moisture thereby preventing an electrolytic action.

In practicing our invention the pipe line is cleaned and, if desired, a primer, or rubber adhesive, coating or both may be applied thereto which is or are resistant to electrolysis. Over the primer, or adhesive, coating, or over both, one or more layers of sheets of soft rubber are applied, preferably in helical double-lapped convolutions so that the rubber coating is continuous. If desired, the rubber coating may be covered with felt or treated paper. The sheet rubber when applied is in an unvulcanized and tacky condition and may contain some, but not all, of the ingredients necessary to complete a powerful low temperature curing combination including an organic accelerator capable of accelerating vulcanization at ordinary temperatures. Complementary ingredients required to complete the curing combination are incorporated in the rubber by diffusion, as by spraying or painting, after wrapping the rubber upon the pipe. For example, the wrapping may be of rubber compounded with sulphur, zinc oxide, and an amine on which there is subsequently sprayed or painted a powerful accelerator containing the radical $$\underset{X}{\overset{\parallel}{RCSM}}$$

preferably the species, carbutoxy-thione-disulfide, otherwise known as oxy-normal butyl thiocarbonic acid disulphide. A description of such carbon disulphide derivative accelerators designated by the radical $$\underset{X}{\overset{\parallel}{RCSM}}$$

is found in the Cadwell Patent No. 1,440,962 and 1,777,960. The absorption of the complementary chemical by the rubber completes the curing combination and causes the rubber to cure in situ at ordinary temperatures, due to the use of the low-temperature vulcanization accelerator, thereby making a continuous vulcanized rubber covering. It has been found that rubber covering so applied at a room temperature will have a tensile strength of 2400 pounds per square inch after 72 hours.

It is also possible to apply our covering by applying successive layers of rubber, each of which layer contains certain different vulcanizing chemicals and when the superimposed successive layers are brought together and assembled, curing takes place, as described in the Cadwell Patent No. 1,777,960.

The covering applied in accordance with the heretofore described methods is particularly advantageous in that the rubber covering is continuous with the pipe line and is not interrupted at the welds or joints at the ends of the pipe sections.

Figure 2:
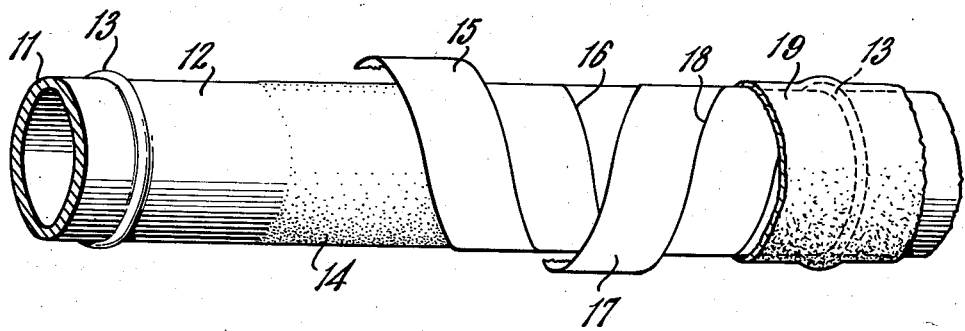

The accompanying figures of the drawing illustrate certain present preferred embodiments of the invention, in which:

Fig. 1 is a view, partially in elevation and partially in section, showing the application of a rubber covering to a portion of a pipe line in accordance with one embodiment of our invention; and Fig. 2 is a similar view illustrating another embodiment of our invention.

Referring to Fig. 1, the pipe line illustrated therein comprises two or more sections 1 and 2 connected by a permanent connection 3, illustrated as a weld, it being understood that the sections 1 and 2 may be joined by any conventional type of connecting means in lieu of the weld 3. The surfaces of the sections 1 and 2 are cleaned and are covered with a coating 4 which may be a priming coating such as an enamel, asphalt, or a coating of a rubber adhesive, or a combination of superimposed layers of priming and adhesive materials. The coating 4 is particularly advantageous in that it acts to exclude moisture from the pipe sections 1 and 2 and thereby prevent a subsequent electrolytic action. If a rubber adhesive is used, it is possible to bond all the rubber covering to the metal, or to an underlying priming coating, if used. After the coating 4 is sufficiently dry, a layer 5 of unvulcanized and tacky rubber is applied over the coating 4, preferably in double-lapped convolutions, so that the rubber coating is continuous. A total thickness of .040 inch of rubber is satisfactory. This may be increased or decreased in accordance with the type of soil.

The rubber strip 5 preferably contains some, but not all, of the ingredients necessary to complete a powerful low temperature curing combination. The complementary curing ingredients are incorporated in the applied rubber covering by diffusion, as by spraying or painting, indicated by stippling 6. As an example, the rubber wrapping 5 may be of rubber compounded with sulphur, zinc oxide, and an amine, and the complementary curing ingredients, applied as a paint or spray, contains a powerful accelerator of the $$\underset{X}{\overset{RCSM}{\|}}$$

type such as carb-butoxy-thione-disulfite. The application of such accelerators for completing a powerful vulcanizing combination is shown and claimed in the Cadwell Patent No. 1,777,960.

A suitable composition for the rubber strip 5 is given in the following table:

| | |
|---|---|
| Smoked sheet | 58.00 |
| Sulphur | .75 |
| Dibenzylamine | 2.00 |
| Cumarone resin | 2.00 |
| Zince oxide | 8.00 |
| Suprex clay | 20.00 |
| Soft carbon black | 10.00 |
| | 100.75 |

In applying the complementary curing ingredients, the rate of curing may be varied in accordance with the concentration of the solution or powder. For example, if liquid carb-butoxy-thione-disulfide is diluted to a 25 percent concentration in solvent naphtha, approximately five days at ordinary temperatures is required to obtain a tensile strength of 2400 pounds per square inch; whereas undiluted carb-butoxy-thione-disulfide will accomplish the same cure in three days.

After the accelerating ingredients 6 are applied to the applied rubber covering 5, the latter may be covered with a wrapping 7 of felt or treated paper, the function of which is to prevent the absorption of the curing powder or solution by the earth in the event that the pipe is immediately laid in position in the ground or covered in a trench.

In field tests we have found that such a pipe line laid in a "hot spot" in Texas was intact after twelve months exposure, except for the deterioration of the paper covering 7. The deterioration of the paper covering was of no material disadvantage as it had long since served its original purpose of acting as a temporary retaining medium for the curing ingredients. At the same time a bare two-inch pipe line laid parallel to the pipe line of the present invention was pitted to a depth of .093 inch.

While we have described the application of the rubber covering to a continuous length of pipe line, the rubber covering may be applied only in such lengths as may be required by the nature of the soil or surrounding circumstances. The covering may also be applied after the pipe line has been in service for some time and has been uncovered.

Referring to Fig. 2, the portion of a pipe line illustrated therein comprises sections 11 and 12 which are connected by permanent welds 13. The surfaces of the sections 11 and 12 are cleaned and are covered with a primer coating 14, as heretofore described. Over the primer coating 14 a layer 15 of rubber is applied in sheet form with the edges of the sheets abutting along seam lines 16. Preferably, the strips constituting the layer 15 are applied helically so that the lining is continuous throughout the length of the pipe line. A similar rubber layer 17 is placed over the layer 15, but preferably with a joint 18 extending helically in a reverse direction. If desired, the outer covering 17 may be covered with a protective wrapping 19 of felt or treated paper.

The rubber layer 15 contains certain of the necessary vulcanizing agents and the layer 17 contains the complementary agents so that in the two coatings as superimposed, the vulcanizing agents migrate and complete the vulcanization of both coats, as described in the Cadwell Patent No. 1,777,960.

By practicing our invention there is provided a pipe line having a continuous protective covering of rubber vulcanized or cured in situ which clings closely to the surfaces of the pipe. The presence of joints between pipe sections does not interrupt the rubber covering or cause it to be separated therefrom as it extends over such connections. The rubber is applied in the field by a wrapping operation and does not require the presence of elaborate machinery since the rubber is cured in situ and at ordinary atmospheric temperatures.

The rubber used should have characteristics such that it is resistant to penetration and abrasion by stones and rocks in the surrounding soil during the filling of the ditch in which the pipe line is laid and during the relative elongation and contraction of the pipe line due to the temperature changes. As the resiliency and resistance of rubber are much superior to those of asphalt, as heretofore used, it is possible to obtain a rubber protective coating for pipe lines which is superior to the present asphalt coatings, particularly in "hot spots" in the soil which are particularly destructive to pipe lines because of the special characteristics of the soil and the resultant electrolytic reactions.

While we have shown and described certain present preferred embodiments of our invention and methods of practicing the same, it is to be understood that the invention may be otherwise embodied and practiced within the spirit thereof and the scope of the appended claims.

Having thus described our invention what we claim and desire to protect by Letters Patent is:

1. A process of protectively coating underground metallic pipe-line of considerable length which is to be embedded in the earth in the form of joined sections against electrolytic corrosion, soil-stress, and pipe motion which comprises applying unvulcanized sheet rubber composition over the outer longitudinal surface of said pipe sections after their assemblage in the field, said rubber composition containing part of a powerful low-temperature vulcanizing combination, which combination includes an organic accelerator, and then incorporating into the rubber composition by diffusion the complementary ingredients required to complete said powerful vulcanizing combination, at the situs of assembly in the field, and allowing said composition to vulcanize in situ at local atmospheric temperature while said rubber composition is protected by a temporary outer covering over said rubber composition.

2. A process of protectively coating underground metallic pipe-line of considerable length which is to be embedded in the earth in the form of joined sections against electrolytic corrosion, soil-stress, and pipe motion, which comprises spirally wrapping unvulcanized sheet rubber composition around the outer longitudinal surface of said pipe-sections after their assemblage in the field and bearing a surface coating of material resistant to electrolysis, at the situs of assembly in the field, said rubber composition containing part of a powerful low-temperature vulcanizing combination, which combination includes an organic accelerator, and then incorporating into the rubber composition by diffusion the complementary ingredients required to complete said powerful vulcanizing combination, at the situs of assembly in the field, and allowing said composition to vulcanize in situ at local atmospheric temperature while said rubber composition is protected by a temporary outer covering over said rubber composition.

3. A process of protectively coating underground metallic pipe-line of considerable length which is to be embedded in the earth in the form of joined sections against electrolytic corrosion, soil-stress, and pipe motion, which comprises spirally wrapping unvulcanized sheet rubber composition around the outer longitudinal surface of said pipe-sections after their assemblage in the field and bearing a surface coating of material resistant to electrolysis, at the situs of assembly in the field, said rubber composition containing part of a powerful low-temperature vulcanizing combination, which combination includes an organic accelerator, and then incorporating into the rubber composition by diffusion the complementary ingredients required to complete said powerful vulcanizing combination in the form of a migratory low-temperature vulcanization accelerator, at the situs of assembly in the field, and allowing said composition to vulcanize in situ at local atmospheric temperature while said rubber composition is protected by a temporary outer covering over said rubber composition.

4. A process of protectively coating underground metallic pipe-line of considerable length which is to be embedded in the earth in the form of joined sections against electrolytic corrosion, soil-stress, and pipe motion, which comprises spirally wrapping unvulcanized sheet rubber composition around the outer longitudinal surface of said pipe-sections after their assemblage in the field and bearing a surface primer coating of material resistant to electrolysis, at the situs of assembly in the field, said rubber composition containing part of a powerful low-temperature vulcanizing combination, which combination includes an organic accelerator, and then incorporating into the rubber composition by diffusion the complementary ingredients required to complete said powerful vulcanizing combination in the form of a migratory low temperature vulcanization accelerator which is a derivative of carbon disulphide, at the situs of assembly in the field, and allowing said composition to vulcanize in situ at local atmospheric temperature while said rubber composition is protected by a temporary outer covering over said rubber composition.

5. A process of protectively coating underground metallic pipe-line of considerable length which is to be embedded in the earth in the form of joined sections against electrolytic corrosion, soil-stress, and pipe motion which comprises applying unvulcanized sheet rubber composition over the outer longitudinal surface of said pipe sections after their assemblage in the field and bearing a surface coating of material resistant to electrolysis, at the situs of assembly in the field, said rubber composition containing part of a powerful low-temperature vulcanizing combination, which combination includes an organic accelerator, and then introducing into said rubber composition by diffusion the remainder of said vulcanizing combination in the form of a strong migratory organic accelerator which is a derivative of carbon disulphide, and allowing said composition to vulcanize in situ at local atmospheric temperatures while protected by a temporary outer covering over said rubber composition.

6. A process of protectively coating underground metallic pipe-line of considerable length which is to be embedded in the earth in the form of joined sections against electrolytic corrosion, soil-stress, and pipe motion which comprises applying unvulcanized sheet rubber composition over the outer longitudinal surface of said pipe sections after their assemblage in the field, and bearing an adhesive rubber coating, said rubber composition containing part of a powerful low temperature vulcanizing combination, which combination includes an organic accelerator, and then incorporating into the rubber composition by diffusion carb-butoxy-thione disulphide to complete said powerful vulcanizing combination, at the situs of assembly in the field, and allowing said composition to vulcanize in situ at local atmospheric temperature while said rubber composition is protected by a temporary outer covering over said rubber composition.

HENRY F. GREMMEL.
HAROLD D. RICE.